United States Patent
Dawani et al.

(10) Patent No.: US 11,516,050 B2
(45) Date of Patent: Nov. 29, 2022

(54) MONITORING NETWORK TRAFFIC USING TRAFFIC MIRRORING

(71) Applicant: Amazon Technologies, Inc., Seattle, WA (US)

(72) Inventors: Anoop Dawani, Kirkland, WA (US); Joseph Elmar Magerramov, Bellevue, WA (US); Zachary Brandes, Seattle, WA (US); Apoorv Mittal, Seattle, WA (US); Bharadwaj Avva, Bothell, WA (US); Ryan James Schaefer, Seattle, WA (US); Kiran Venkat Sayeeram Karpurapu, Seattle, WA (US); Ajay Jha, Seattle, WA (US); Steven Bruce Richards, Seattle, WA (US); Richard H Galliher, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 206 days.

(21) Appl. No.: 16/579,743

(22) Filed: Sep. 23, 2019

(65) Prior Publication Data
US 2020/0403826 A1 Dec. 24, 2020

Related U.S. Application Data

(60) Provisional application No. 62/865,109, filed on Jun. 21, 2019.

(51) Int. Cl.
*H04L 12/46* (2006.01)
*H04L 43/10* (2022.01)

(52) U.S. Cl.
CPC .......... *H04L 12/4641* (2013.01); *H04L 43/10* (2013.01); *H04L 2212/00* (2013.01)

(58) Field of Classification Search
CPC . H04L 12/4633; H04L 12/4641; H04L 41/22; H04L 43/028; H04L 43/12; H04L 43/022; H04L 2212/00
See application file for complete search history.

(56) References Cited

U.S. PATENT DOCUMENTS

| | | | |
|---|---|---|---|
| 9,906,401 B1 * | 2/2018 | Rao ....................... | H04L 43/028 |
| 2008/0133856 A1 * | 6/2008 | Ontko ................. | G06F 11/2069 |
| | | | 711/E12.103 |

(Continued)

FOREIGN PATENT DOCUMENTS

WO WO2020123467 6/2020

OTHER PUBLICATIONS

The PCT Search Report and Written Opinion dated Sep. 18, 2020 for PCT Application No. PCT/US2020/036763, 16 pages.

(Continued)

*Primary Examiner* — Elton Williams
(74) *Attorney, Agent, or Firm* — Lee & Hayes, P.C.

(57) ABSTRACT

Technologies are disclosed for monitoring network traffic using traffic mirroring. According to some examples, traffic mirroring allows customers to monitor traffic at different sources within a VPC. For example, a source may be any Elastic Network Interface (ENI) in their VPC, including elastic network interfaces (ENIs) on virtual machine instances, Network Address Translation (NAT) Gateways, Load Balancers, VPC endpoints, Internal Gateways, Transit Gateways, and more. Filters can be utilized to determine the network traffic to mirror. A customer may also configure to monitor real-time traffic with a monitoring appliance of their choice. With traffic mirroring, data traffic may be identified and sent to one or more target devices. Customers may monitor traffic within a VPC for content inspection, forensic analysis, troubleshooting, record keeping, and the like. Using traffic mirroring, customers can replicate VPC traffic, (Continued)

along with full payload data, without installing and managing agents on virtual machine instances.

20 Claims, 11 Drawing Sheets

(56) References Cited

U.S. PATENT DOCUMENTS

2016/0294731 A1* 10/2016 McDaniel ........... H04L 41/0806
2019/0207812 A1*  7/2019 Li ....................... H04L 67/10
2020/0073692 A1*  3/2020 Rao ..................... G06F 9/45558
2020/0092299 A1*  3/2020 Srinivasan ............ G06F 21/552

OTHER PUBLICATIONS

The International Preliminary Report on Patentability for PCT Application No. PCT/US20/36763, 10 pages.

* cited by examiner

MONITORING NETWORK TRAFFIC USING TRAFFIC MIRRORING

RELATED APPLICATION

This application claims the benefit of priority to provisional U.S. Patent Application Ser. No. 62/865,109, filed on Jun. 21, 2019 and entitled "Monitoring Network Traffic Using Traffic Mirroring", which is herein incorporated by reference in its entirety.

BACKGROUND

Distributed computing systems as well as distributed computing services have become widely available. In some cases, such services and/or systems may route or otherwise transmit large amounts of data for one or more computing devices associated with the services. These services may include one or more computing devices configured to act as machine instances (e.g., virtual computer systems) and/or storage resources (e.g., virtual disk drives), for example. Monitoring network traffic associated with the transmission of the distributed data, however, can pose challenges to computing systems, service providers, clients, and/or users. For instance, monitoring the network traffic can be costly, difficult to scale, pose a security risk, may affect performance, and the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
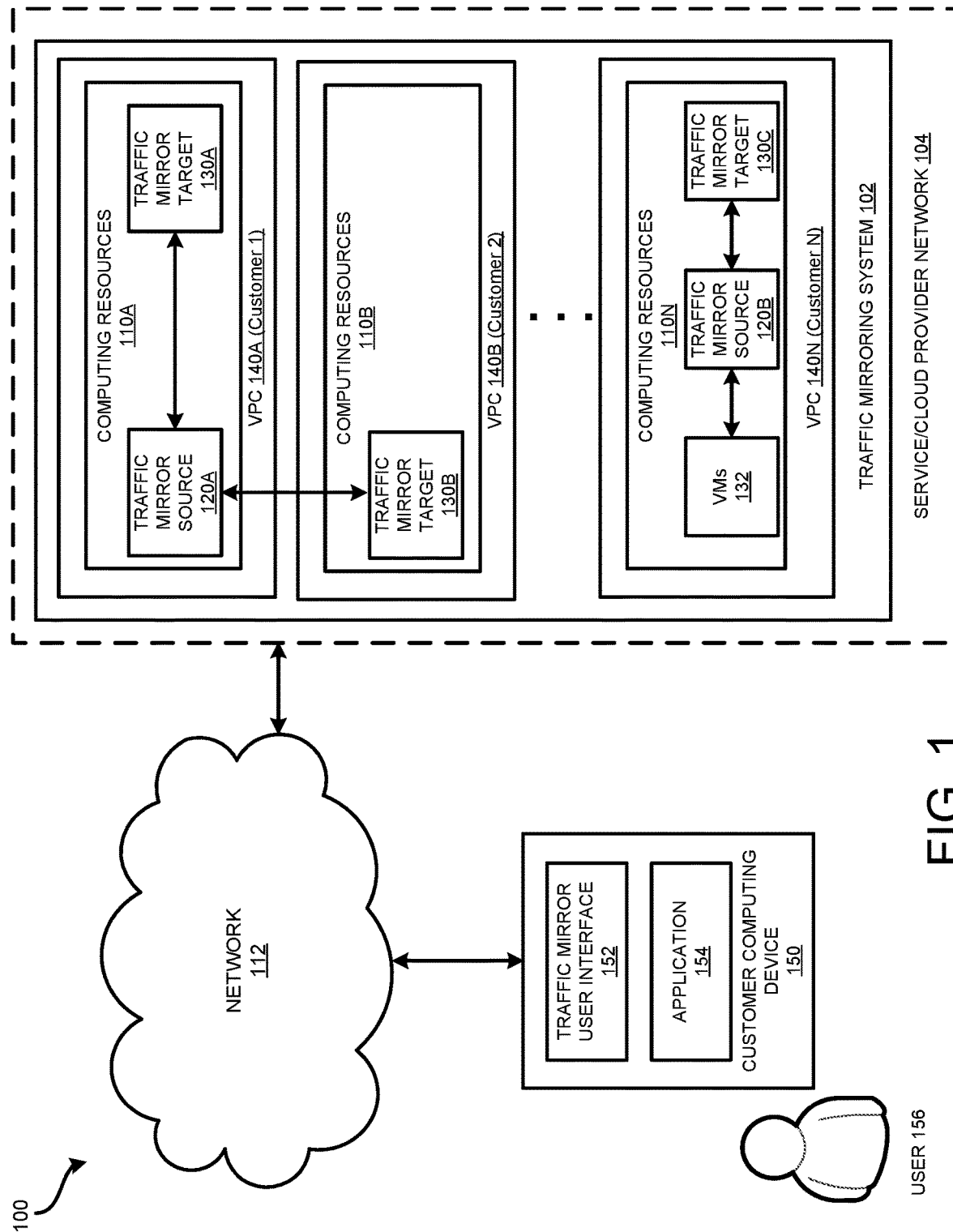
FIG. 1 is a software and network architecture diagram showing aspects of the configuration and utilization of a traffic mirroring system for monitoring network traffic using traffic mirroring.

The following detailed description is directed to technologies for monitoring network traffic using traffic mirroring. According to some examples, a user, such as a customer of a service provider may configure a traffic mirroring session to mirror traffic from a traffic mirror source within a service provider network to one or more traffic mirror targets.

As used herein, a "traffic mirror source" is a source within a service provider network that receives and outputs data packets for delivery within the service provider network. According to some configurations, a traffic mirror source may be a computing resource within a Virtual Private Cloud (VPC), that can be used as a source of data traffic. In some examples, a traffic mirror source may be an Elastic Network Interface (ENI), a Network Load Balancer (NLB), an Internal Gateway (IGW), a Transit Gateway (TG), a virtual machine instance, an interface for an Elastic Container Service (ECS), an interface for an Elastic Kubernetes Service (EKS), an interface for a compute engine that runs containers (e.g., AWS® Fargate), an interface for a service that runs code without provisioning or managing servers (e.g., AWS® Lambda), and the like. A "traffic mirror target", is a destination for mirrored traffic. In some examples, a traffic mirror target is a computing resource, application, or some other source that may receive/provide data traffic. According to some configurations, a traffic mirror target may be within a same VPC as the traffic mirror source or a different VPC that may or may not be associated with the customer.

Using techniques described herein, customers of a service provider can configure one or more traffic mirroring sessions to mirror traffic from a traffic mirroring source within a service provider network to one or more traffic mirroring targets. As used herein, a "traffic mirroring session" is data that describes traffic mirroring from a traffic mirror source to one or more traffic mirror targets using one or more filters. According to some configurations, the customer specifies one or more filter rules that define what incoming/outgoing data packets received/transmitted by the traffic mirror source are mirrored to one or more traffic mirror targets. The filter rules may specify rules for both inbound and outbound data traffic from the traffic mirror source. In some examples, the customer may also limit the size of the payload that is mirrored to a traffic mirror target.

In some examples, the customer configures traffic mirroring sessions using a graphical user interface (GUI). In other examples, the customer may use a command line interface, or utilize an Application Programming Interface (API) to configure a traffic mirroring session. After configuring a traffic mirroring session, incoming and outgoing data packets to/from the traffic mirror source are monitored to determine what data packets to mirror to the one or more traffic mirror targets. Using traffic mirroring, customers can replicate VPC traffic, along with full/partial payload data, without installing and managing agents on virtual machine instances.

Traffic mirroring allows customers, or other authorized users, to monitor traffic within their networks, or associated networks, (e.g., a VPC infrastructure) for content inspection, forensic analysis, troubleshooting, record keeping, testing and troubleshooting, and the like. For example, a customer can analyze specific traffic patterns for their applications to identify any vulnerable 'blind spots' or 'choke points' between application tiers and/or virtual machine instances.

In this way, a customer can consistently access and deliver traffic to out-of-band security and monitoring appliances by streaming mirrored traffic directly to a monitoring appliance of their choice. Beneficially, the disclosed traffic mirroring technology can capture a packet such as a layer 2 (data layer) packet and convert it into an IP packet (e.g., layer 4) via encapsulation, such that the packet can be sent out over private networks to on-premise destinations as well as destinations within the service provider network. Encapsulation, as described herein, refers to addition of data or fields to the packet header. For example, any traffic that matches filter rules can be encapsulated in a Virtual Extensible LAN (VxLAN) header, and then copied to the target. Generally, encapsulation can be used to increase scalability by increasing a number of logical networks. VxLAN provides approximately sixteen million addresses. In some examples, the encapsulated traffic may be unencapsulated when provided to the target.

Prior to traffic mirroring as described herein, customers had to install and maintain separate third-party agents on virtual machine instances to capture traffic. This approach not only increases the operational burden for customers but also introduces additional cost and performance challenges. Not only may customers have to pay and procure incremental licenses as virtual machine instances are scaled to handle the mirroring, the customers pay additional CPU costs for running agents on virtual machine instances. Furthermore, agent-based approaches cannot be used to capture traffic on various services, such as network address translation (NAT) Gateways, Elastic Load Balancer, and the like. Still further, an agent-based approach is typically proprietary, which makes it difficult for customers to use multiple security tools to analyze traffic within a VPC.

Further, without traffic visibility, enterprises use log centric tools for security and compliance purpose. However, log-centric tools make it difficult to detect and investigate complex threats in a timely manner, as they do not have full visibility into the traffic. Utilizing techniques described herein, traffic mirroring may be used by customers to mirror traffic of interest within a VPC and send it to one or more security tools to detect and respond faster to attacks often missed by traditional log-centric tools. Traffic mirroring can also be used to capture data for an application, such as a game or some other type of application. For example, gaming data, or other application data, can be captured for replay (e.g., in a test environment in a network hosted by a service provider).

In some configurations, the computing resources used to provide functionality described herein may be server computer systems and/or data storage computer systems in a distributed computing environment, although other computing resources are considered as being within the scope of the present disclosure, some examples of which are provided below. Additionally, examples of the present disclosure may also be directed to, among other things, traffic mirroring or otherwise capturing data packets associated with the operation and/or other configurations of the computing resources described herein. The service provider may mirror or otherwise provide a data packet to an appropriate network port and/or to a listening station or other monitoring device connected to that network port. Additional details regarding the various components and processes described briefly above for monitoring network traffic using traffic mirroring will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram 100 showing aspects of the configuration and utilization of a traffic mirroring system 102 for monitoring network traffic using traffic mirroring. It is to be appreciated that the environment 100 is merely illustrative and that the various configurations disclosed herein can be utilized in many different types of computing environments.

To provide functionality disclosed herein, the traffic mirroring system 102 may include one or more computing resources 110, such as computing resources 110A, computing resources 110B, to computing resources 110N. The computing resources 110 may be provided by a service provider that operates one or more service/cloud provider networks 104 (sometimes referred to simply as a "cloud"), which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients. The computing resources 110 implemented by the traffic mirroring system 102 and executed on behalf of one or more customers of the service provider can be data processing resources, such as virtual machine ("VM") instances, data storage resources, networking resources, data communication resources, network services, and other types of resources.

The computing resources 110 utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The traffic mirroring system 102 can also include and utilize other types of computing resources not mentioned specifically herein.

According to some configurations, servers are utilized to provide at least a portion of the computing resources 110 and execute software components to provide functionality described herein, including traffic mirroring functionality. The software components can execute on a single server or in parallel across multiple servers in the traffic mirroring system 102. In addition, a software component can consist of subcomponents executing on different servers or other computing devices in the traffic mirroring system 102. Various components can be implemented as software, hardware, or any combination of the two. In this regard, it is to be appreciated that the traffic mirroring system 102 shown in FIG. 1 has been simplified for discussion purposes and that many additional software and hardware components can be utilized.

As illustrated, traffic mirroring system 102 includes VPC 140A, VPC 140B, to VPC 140N. Generally, a VPC may be a virtual network that includes an on-demand configurable pool of shared computing resources allocated within a public cloud environment. Typically, VPC(s) of one customer of a service provider network are isolated from VPC(s) of other customers of the service provider network. The isolation between customers of the service provider may be achieved through allocation of a private IP subnet and a virtual communication construct (such as a VLAN or a set of encrypted communication channels) per customer. A VPC can be a custom-defined, virtual network within a cloud provider network. A VPC can provide the foundational network layer for a cloud service, for example a compute cloud or an edge cloud, or for a customer application or workload that runs on the cloud. A VPC can be defined by at least its address space, internal structure, and transit paths.

A customer may launch computing resources, such as virtual machine instances, into a VPC. A customer may specify an IP address range for the VPC, add subnets, associate security groups, and configure route tables, and the like. As discussed above, using technologies described herein, a customer may configure traffic mirroring sessions to mirror desired types of VPC traffic to one or more or traffic mirror targets.

In an example illustrated in FIG. 1, a first customer "Customer 1" has created a traffic mirroring session to mirror traffic from traffic mirror source 120A to traffic mirror target 130A that are both within VPC 140A. Customer 1 has also created a traffic mirroring session to mirror traffic from traffic mirror source 120A to traffic mirror target 130B that is located within VPC 140B that is associated with a second customer "Customer 2". In some examples, the customer may utilize a graphical user interface, a command line interface, or some other method to use a traffic mirror target that is located in a VPC that is not associated with the customer. In other examples, a customer may create and specify traffic mirror targets, such as traffic mirror target 130B, that may be shared with other customers. For example, Customer 2 may create traffic mirror target 130B and specify that it may be utilized by one or more other customers of the service provider.

According to some configurations, when the traffic mirror target 130B is associated with a different customer, such as Customer 2, Customer 2 provides authorization that allows the traffic mirroring source to mirror traffic to the traffic mirror target within VPC 140B associated with Customer 2. In some examples, the customer utilizing the traffic mirror target 130B is authorized to modify or delete the traffic mirror target from the traffic mirroring session created by Customer 1.

FIG. 1 also shows a traffic mirroring session that includes a traffic mirror source 120B and a traffic mirror target 130C. In this example, the traffic mirror source receives data from VMs 132 and mirrors the data received by the traffic mirror source 120B to the traffic mirror target 130C. According to some configurations, when a traffic mirror source, such as traffic mirror source 120B, includes monitorable sources behind it, each of the monitorable sources (e.g., each of the VMs 132) are configured as a traffic mirror source 120. In other examples, the traffic mirror source 120B that includes monitorable sources behind it applies filters to incoming data packets from VMs 132 and outgoing data packets from traffic mirror source 120B. This example illustrates that a traffic mirror source may receive data packets from many different sources. In some configurations, customers may specify all/portion of the VPC or subnet as a source for traffic mirroring. As such, a customer does not specifically have to configure each of the VMs 132 (or other computing resources) for sharing in a VPC or subnet.

In some examples, the traffic mirror source 120B may be a NLB that includes a variety of different instances located behind it. When configuring a traffic mirroring session, customers can choose wide variety of filtering options associated with incoming and/or outgoing packets to only copy desired network packets. The mirrored packets can be sent to a traffic mirror target for further analysis. As discussed above, the traffic mirror source and traffic mirror targets (monitoring appliances) can be in the same VPC or in a different VPC, connected via VPC peering or TG.

As discussed above, the data packets identified to be mirrored are encapsulated in a VxLAN header and sent to network addresses (e.g., associated with monitoring appliances) for further analysis. In some examples, the data packets identified to be mirrored that are encapsulated in a VxLAN header may be unencapsulated before being provided to the target at the network addresses. As used herein, a network address may include any address that may identify a computing resource accessible via a network (e.g., the Internet, a virtual private network, etc.), may indicate a location of any such device including, but not limited to, Internet Protocol (IP) addresses or the like, and/or may indicate an address not yet assigned to a computing resource. The monitoring appliances can be deployed behind a Network Load Balancer (NLB) for high availability.

As discussed herein, traffic mirroring is directed at allowing customers of a service provider to mirror any amount of their VPC traffic, without requiring the customer to install and utilize agents on instances. In some examples, traffic mirroring allows customers to monitor traffic at any Elastic Network Interface (ENI) in their VPC, including elastic network interfaces (ENIs) on Network Address Translation (NAT) Gateways, Load Balancers, IGs, VPC endpoints, interfaces for Elastic Container Service (ECS), interfaces for an Elastic Kubnernetes Service (EKS), interfaces for a compute engine that runs containers (e.g., AWS® Fargate), interfaces for a service that runs code without provisioning or managing servers (e.g., AWS® Lambda), and more. Customers can also apply a wide variety of filters to only copy desired network traffic rather than all of the data. Rather than being restricted to proprietary solutions, traffic mirroring assists customers in being able to provide mirrored data to a variety of different endpoints.

A user 156 of the traffic mirroring system 102 can utilize a customer computing device 150, or some other input device, to access the traffic mirroring system 102 through a network 112. The user 156 may be a customer of a service provider network that provides computing resources within a service provider network for one or more VPCs 140 within traffic mirroring system 102.

The computing device 150 is an input device configured to receive input associated with establishing one or more traffic mirroring sessions. The computing device 150 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, or any other type of computing device capable of connecting to the network 112 and communicating with the traffic mirroring system 102. In other configurations, the computing device 150 may be configured to communicate with one or more other devices to perform processing related to functionality of the traffic mirroring system.

Figure 3A:
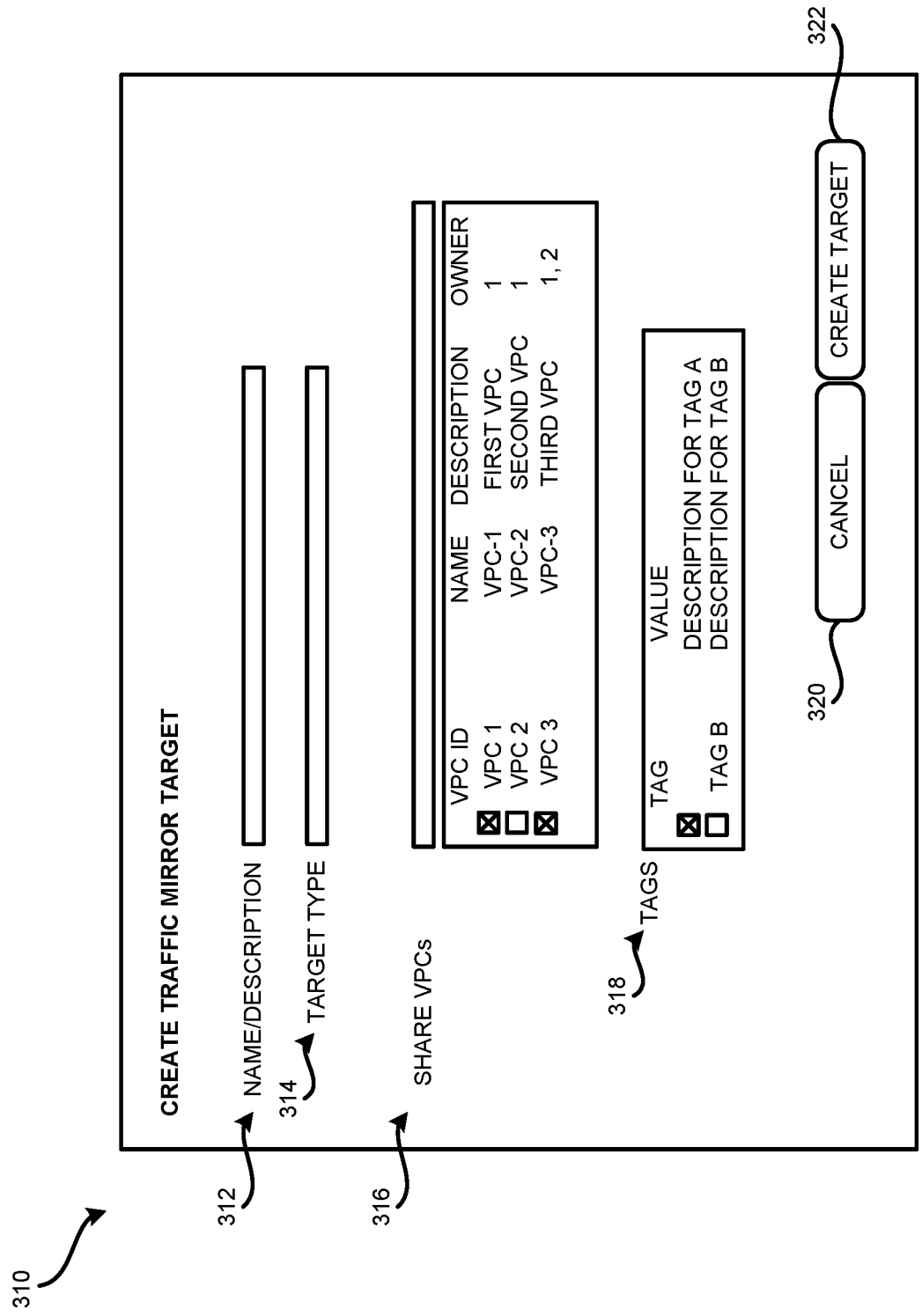
FIG. 3A, FIG. 3B, and FIG. 3C are diagrams showing illustrative graphical user interfaces for configuring aspects of a traffic mirroring session.

Within FIG. 1, the user 156 may interact with the computing device 150 within the environment 100 via the traffic mirror user interface 152. For example, the traffic mirror user interface 152 may be configured to create traffic mirror sources, mirror targets, and traffic mirror sessions, such as shown in FIGS. 3A. 3B, and 3C.

As illustrated, the computing device 150 may couple with the traffic mirroring system 102 over a network 112. The network 112 may represent an array or wired networks, wireless networks (e.g., WiFi), or combinations thereof. The traffic mirroring system 102 may provide a variety of different services (not shown) as a network-accessible platform that is implemented as a computing infrastructure of processors, storage, software, data access, and so forth that is maintained and accessible via the network 112, such as the Internet. These services may not require end-user knowledge of the physical location and configuration of the system that delivers the services. Common expressions associated with these remote services, include "on-demand computing", "software as a service (SaaS)", "platform computing", "network accessible platform", and so forth.

The network 112 can be a local-area network ("LAN"), a wide-area network ("WAN"), the Internet, or any other networking topology known in the art that connects the user devices to the traffic mirroring system 102. The user 156 can use an application 154 executing on computing device 150 to access and utilize the functionality provided by traffic mirroring system 102. In some examples, the application 154 is a web browser application, such as the Amazon® Silk® web browser, or some other web browser. Generally, a web browser application exchanges data with the computing devices in the traffic mirroring system 102 using the hypertext transfer protocol ("HTTP") over the network 112.

The application might also be a stand-alone client application 154 configured for communicating with the traffic mirroring system 102. The client application 154 can also utilize any number of communication methods known in the art to communicate with the traffic mirroring system 102 across the network 112, including remote procedure calls, SOAP-based web services, remote file access, proprietary client-server architectures, and the like. According to some configurations, the application 154 provides a traffic mirror user interface 132 that can be utilized by the user 156 to configure traffic mirroring sessions. The traffic mirror user interface 152 may also be utilized to present data, and/or to interact with the traffic mirroring system 102.

In some examples, web service users or, in general, clients may utilize or otherwise control a processing entity of the service provider to control, access, or otherwise manage other computing resources. As such, data associated with the processing entity and/or the computing resources of the service provider may be transmitted to or received from computing resources of a client's private network (or other local network) via one or more network connections. As used herein, a processing entity may be a computing resource of the service provider and may include one or more computing devices, such as instantiated virtual machine instances, configured to access data of the distributed computing system (e.g., provided by the distributed system and acting on behalf of a client or user of the system).

In some configurations, the service provider may also provide storage, access, and/or placement of one or more computing resources through a service such as, but not limited to, a web service, a cloud computing service, or other network-based data management service. For example, a user or processing entity acting on behalf of the user may access, via the service provider, data storage services and/or data management services such that access mechanisms may be implemented and/or provided by the service provider to the processing entity utilizing the computing resources. In some examples, computing resource services, such as those provided by the service provider, may include one or more computing resources accessible across one or more networks through user interfaces (UIs), application programming interfaces (APIs), and/or other interfaces where the one or more computing resources may be scalable and/or expandable as desired A customer of a service provider associated with a service provider network can set filters to mirror desired types of VPC traffic, along with a desired portion or quantity of payload data, without installing and managing agents on virtual machine instances.

As briefly discussed above, customers may configure traffic mirror sessions to mirror data from traffic that flows through a VPC associated with the customer. In some examples, a traffic mirror session comprises traffic mirror source, a traffic mirror target, and a filter that includes one or more filter rules. A traffic mirror source may have more than one traffic mirror session associated with it. For instance, as described above, traffic mirror source 120A has two traffic mirror sessions. The first traffic mirror session mirrors data packets to the traffic mirror target 130A, and a second traffic mirror session mirrors data packets to traffic mirror target 130B.

Figure 3B:
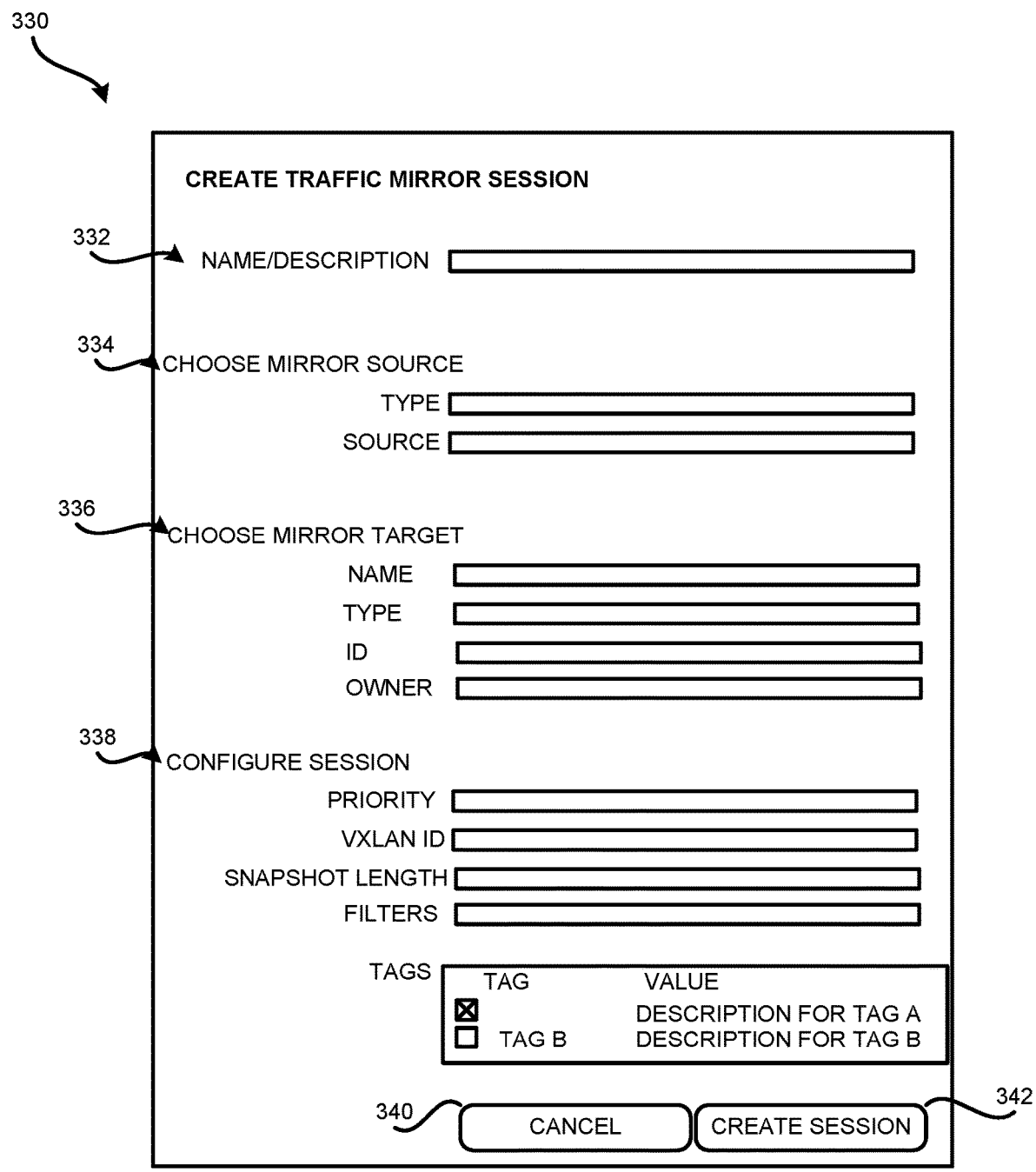
Figure 3C:
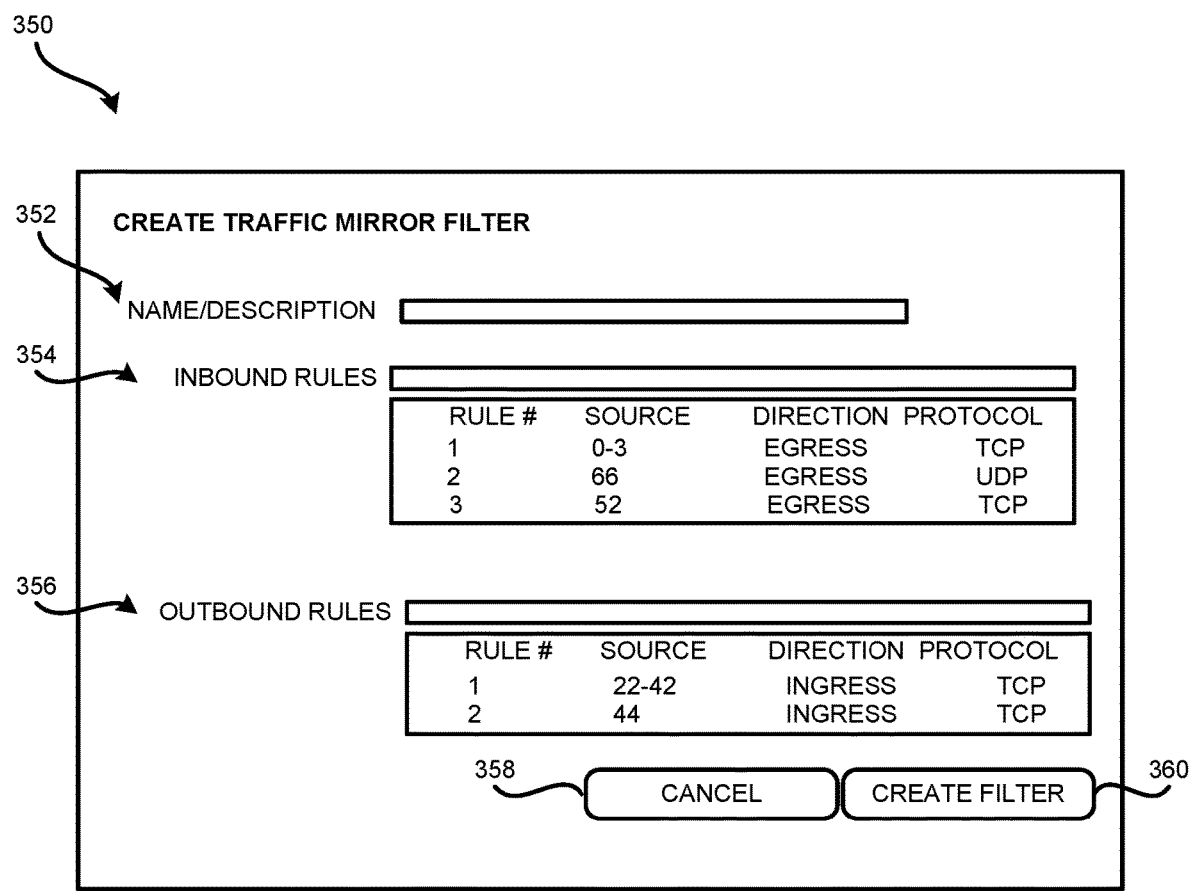

In some examples, the customer configures traffic mirroring sessions using a graphical user interface (GUI). In other examples, the customer may use a command line interface, or utilize an Application Programming Interface (API) to configure a traffic mirroring session. For example, a customer may use one or more GUIs such as illustrated in FIG. 3A, FIG. 3B, and FIG. 3C to configure a traffic mirror session, a traffic mirror source, traffic mirror targets, and filters (See FIG. 3A, FIG. 3B, and FIG. 3C and related description for more details).

After configuring the traffic mirroring session, incoming and outgoing data packets to/from the traffic mirror source(s) are monitored (e.g., by an application executing on the traffic mirror source(s)) to determine what data packets to mirror to the one or more traffic mirror targets. Using traffic mirroring, customers can replicate VPC traffic, along with full/partial payload data, without installing and managing agents on virtual machine instances. In some examples, encapsulation is used to transfer data packets to other network addresses. In some configurations, when a data packet is identified to be mirrored to a traffic mirror target, the data packet is encapsulated as a layer 4 packet. Encapsulation, as described herein, refers to addition of data or fields to the packet header. For example, any traffic that matches filter rules can be encapsulated in a Virtual Extensible LAN (VxLAN) header, and then copied to the target. According to some examples, the data packet received is a layer 2 (data layer) data packet that is then converted into an IP packet (e.g., layer 4) via encapsulation, such that the packet can be sent out over private networks to on-premise destinations as well as destinations (e.g., other VPCs) within the service provider network.

Additional details regarding the various components and processes described briefly above for interacting with a virtual assistant to coordinate, recommend and perform actions will be provided below with regard to FIGS. 2-9.

Figure 2:
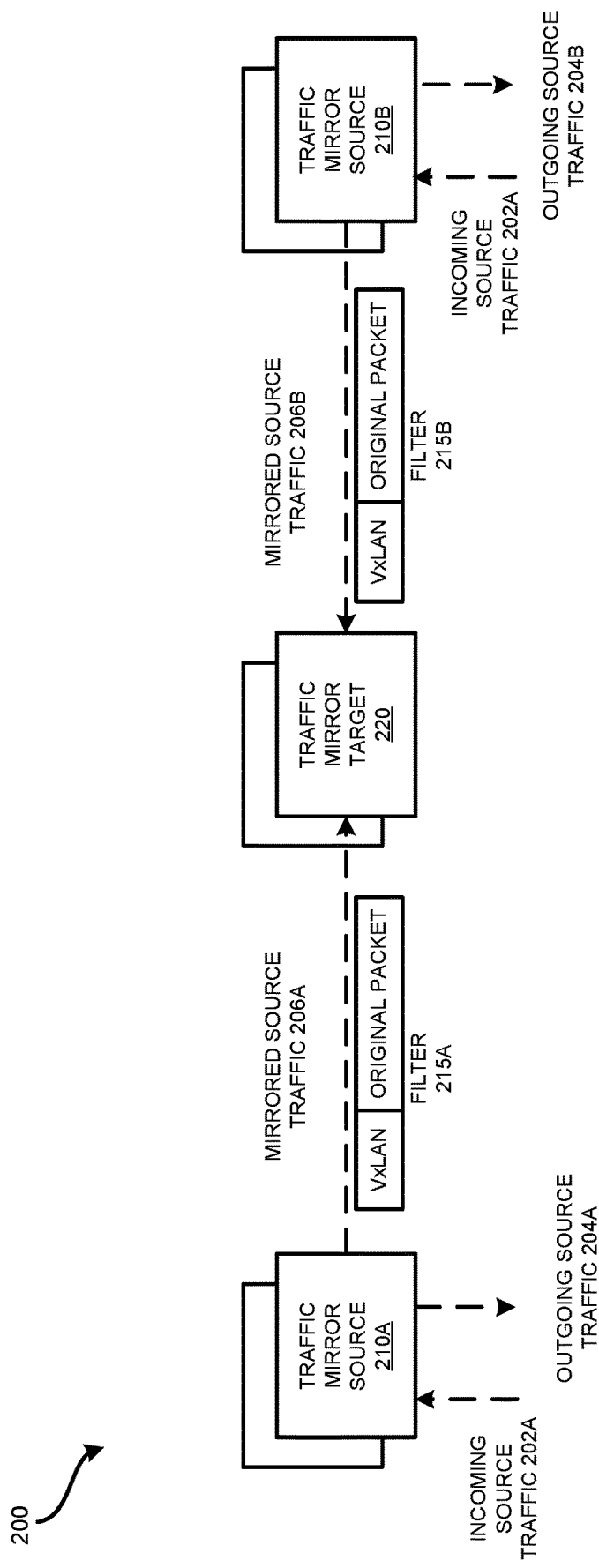
FIG. 2 is a software and network architecture diagram showing aspects of a traffic mirroring system to mirror traffic from different traffic mirror sources to a traffic mirror target.

FIG. 2 is a software and network architecture diagram showing aspects of a traffic mirroring system to mirror traffic from different traffic mirror sources to a traffic mirror target. It is to be appreciated that the environment 200 is merely illustrative and that the various configurations disclosed herein can be utilized in many different types of computing environments.

As illustrated, environment 200 shows a traffic mirror source 210A, a traffic mirror target 220, and another traffic mirror source 210B. The current example illustrates mirroring traffic from two traffic mirror sources to a single traffic mirror target.

In the current example, a first traffic mirroring session is associated with the traffic mirror source 210A, the traffic mirror target 220, and the filter 215A and a second traffic mirroring session is associated with the traffic mirror source 210B, the traffic mirror target 220, and the filter 215B. As described above, a filter may include filter rules that include inbound traffic rules for incoming source traffic 202, and outbound traffic rules that define what outgoing source traffic 204 is copied from the traffic mirror source to the traffic mirror target. As illustrated, the data packets for traffic mirror source 210A that match rules specified by filter 215A are mirrored as mirrored source traffic 206A and provided to the traffic mirror target 220. The data packets for traffic mirror source 210B that match rules specified by filter 215B are mirrored as mirrored source traffic 206B and provided to the traffic mirror target 220.

FIG. 2 also illustrates that the mirrored source traffic 206 is encapsulated with a VxLAN header, according to some examples. In some configurations, the customer may specify a VxLAN ID when configuring a traffic mirroring session. In other examples, the value may be assigned by the traffic mirroring system 102.

As discussed above, traffic mirroring can be configured via one or more GUIs, Application Programming Interfaces (API) calls and/or use of a command line interface.

For example, the following is an example creation process using API calls.

Create traffic mirror target (e.g., traffic mirror target 220): In some configurations, the target may be an ENI, and the like. A target may be created using the following API.

```
create-traffic-mirror-target \
    --network-interface-id 12345678
```

Create filter (e.g., filter 215A): A filter contains set of rules that defines how to filter traffic in a mirroring session. Use following APIs to create filter.

```
create-traffic-mirror-filter
add-traffic-mirror-filter-rule \
    --filter-id tmf-ffffffff
    --rule-number 1 \
    --direction ingress | egress \
    --port-range <value> \
    --protocol <value>
```

Create traffic mirror session (e.g., for traffic mirror source 210A, filter 215A, and traffic mirror target 220):

```
create-traffic-mirror-session \
    --source-network-interface-id eni-defghij \
    --target tmt-ttttttt \
    --filter tmf-ffffffff
    --priority 1
    --VXLAN-id <value>
```

API calls may be associated with other functionality and configuration of traffic mirroring such as, but not limited to modifying filters, traffic mirror sources, traffic mirror targets, setting permissions, sharing a traffic mirror target, pausing/resuming a traffic mirroring session, and the like.

The following show exemplary APIs associated with traffic mirroring sessions.

CreateTrafficMirrorTarget

```
create-traffic-mirror-target \
    --network-interface-id eni-12345678 \
# response:
{
    "TrafficMirrorTarget": {
        "TrafficMirrorTargetId": "tmt-ttttttt",
        "NetworkInterfaceId": "eni-12345678",
        "VpcId:" "vpc-1a2b3c4d"
    }
}
```

Sets an ENI as a TM target
Returns a traffic mirroring target id
DeleteTrafficMirrorTarget

```
delete-traffic-mirror-target \
    --target-id tmt-tttttttt
# response:
{
        "TrafficMirrorTargetId": "tmt-tttttttt"
}
```

Marks an existing target as no longer a target
DescribeTrafficMirrorTargets

```
describe-traffic-mirror-targets \
    (--target-ids tmt-tttttttt)
# response:
{
        "TrafficMirrorTargets": [
            {
                "TrafficMirrorTargetId": "tmt-tttttttt",
                "NetworkInterfaceId": "eni-12345678",
                "VpcId:" "vpc-1a2b3c4d"
            }
        ]
}
```

Info for one or more targets
CreateTrafficMirrorFilter

```
create-traffic-mirror-filter \
# response:
{
        "TrafficMirrorFilter": {
            "TrafficMirrorFilterId": "tmf-ffffffff",
            "FilterRules": [ ]
        }
}
```

Create a TM filter
DescribeTrafficMirrorFilters

```
describe-traffic-mirror-filters \
    (--policy-ids tmf-ffffffff)
# response:
{
        "TrafficMirrorFilters": [
            {
                "TrafficMirrorFilterId": "tmf-ffffffff",,
                "FilterRules": [ ]
            }
        ]
}
```

Get info for one or more filters
DeleteTrafficMirrorFilter

```
delete-traffic-mirror-filter \
    --policy-id tmf-ffffffff
# response
{
        "TrafficMirrorFilterId": "tmf-ffffffff"
}
```

Destroy a TM filter
AddTrafficMirrorFilterRule

```
add-traffic-mirror-filter-rule \
    --filter-id tmf-ffffffff
    --rule-number 1 \
    --direction ingress \
    (--source-port 22) \
    (--protocol TCP)
# response:
{
        "TrafficMirrorFilterRule": {
            "TrafficMirrorFilterId": "tmfr-rrrrrrrr",
            "RuleNumber": 1,
            "Direction": "ingress"
            "SourcePort": 22,
            "Protocol": "TCP"
        }
}
```

Add a TM rule to a filter
ModifyTrafficMirrorFilterRule

```
modify-traffic-mirror-filter-rule \
    --filter-rule-id tmfr-rrrrrrrr
    (--rule-number 1) \
    (--source-port 22) \
    (--protocol TCP)
# response:
{
        "TrafficMirrorFilterRule" : {
            "TrafficMirrorFilterId" : "tmfr-rrrrrrrr",
            "RuleNumber": 1,
            "Direction": "ingress"
            "SourcePort": 22,
            "Protocol": "TCP"
        }
}
```

Add a TM rule to a filter
RemoveTrafficMirrorFilterRule

```
remove-traffic-mirror-filter-rule \
    --filter-rule-id tmfr-rrrrrrrr
# response:
{
        "TrafficMirrorFilterRule": {
            "TrafficMirrorFilterId": "tmfr-rrrrrrrr",
            "RuleNumber": 1,
            "Direction": "ingress"
            "SourcePort": 22,
            "Protocol": "TCP"
        }
}
```

Remove a TM rule from a filter
Sessions: CreateTrafficMirrorSession

```
create-traffic-mirror-session \
    --source-interface-id eni-defghij \
    --target tmt-tttttttt \
    --filter tmf-ffffffff \
    --priority 1 \
    -snapshot-length 255
# response:
{
        "TrafficMirrorSession": {
            "TrafficMirrorSessionId": "tms-ssssssss",
            "TrafficMirrorTargetId": "tmt-tttttttt",
            "TrafficMirrorFilterId": "tmf-ffffffff",
            "VpcId:" "vpc-1a2b3c4d",
            "SourceInterfaceId": "eni-defghij",
```

```
            "Priority": 1,
            "SnapshotLength": 255,
            "Status": "Active"
        }
}
```

Creates a TM session
Returns a traffic mirroring session id
ModifyTrafficMirrorSession

```
modify-traffic-mirror-session \
    --session-id tms-ssssssss \
    (--target tmt-tttttttt) \
    (--filter tmf-ffffffff) \
    (--priority 1) \
    (--snapshot-length) 255
# response:
{
    "TrafficMirrorSession": {
        "TrafficMirrorSessionId": "tms-ssssssss",
        "TrafficMirrorTargetId": "tmt-tttttttt",
        "TrafficMirrorFilterId": "tmf-ffffffff",
        "VpcId:" "vpc-1a2b3c4d",
        "SourceInterfaceId": "eni-defghij",
        "Priority": 1,
        "SnapshotLength": 255,
        "Status": "Active"
    }
}
```

Modify a TM session
PauseTrafficMirrorSessions

```
pause-traffic-mirror-sessions \
    --session-id tms-ssssssss
# response:
{
    "TrafficMirrorSessions": [
        {
            "TrafficMirrorSessionId": "tms-ssssssss",
            "TrafficMirrorTargetId": "tmt-tttttttt",
            "TrafficMirrorFilterId": "tmf-ffffffff",
            "VpcId:" "vpc-1a2b3c4d",
            "SourceInterfaceId": "eni-defghij",
            "Priority": 1,
            "SnapshotLength": 255,
            "Status": "Paused"
        }
    ]
}
```

Pause one or more TM sessions but don't delete them. This allows the customer to maintain the source-target relationship but halt the flow of traffic
ResumeTrafficMirrorSessions

```
resume-traffic-mirror-sessions \
    --session-id tms-ssssssss
# response:
{
    "TrafficMirrorSessions": [
        {
            "TrafficMirrorSessionId": "tms-ssssssss",
            "TrafficMirrorTargetId": "tmt-tttttttt",
            "TrafficMirrorFilterId": "tmf-ffffffff",
            "VpcId:" "vpc-1a2b3c4d",
            "SourceInterfaceId": "eni-defghij",
            "Priority": 1,
            "SnapshotLength": 255,
            "Status": "Active"
        }
    ]
}
```

Resume one or more TM sessions that were paused.
DeleteTrafficMirrorSession

```
delete-traffic-mirror-session \
    --session-id tms-ssssssss
# response:
{
    "TrafficMirrorSessionId": "tms-ssssssss"
}
```

Destroy a TM session
DescribeTrafficMirrorSessions

```
describe-traffic-mirror-sessions \
    (--session-id tms-ssssssss) \
    (--target-id tmt-tttttttt)
# response:
{
    "TrafficMirrorSessions": [
        {
            "TrafficMirrorSessionId": "tms-ssssssss",
            "TrafficMirrorTargetId": "tmt-tttttttt",
            "TrafficMirrorFilterId": "tmf-ffffffff",,
            "VpcId:" "vpc-1a2b3c4d",
            "SourceInterfaceId": "eni-defghij",
            "Priority": 1,
            "SnapshotLength": 255,
            "Status": "Active"
        }
    ]
}
```

Lists info for one or more TM sessions

FIGS. 3A, 3B and 3C are diagrams showing illustrative graphical user interfaces for configuring aspects of a traffic mirroring session. FIGS. 3A, 3B, and 3C illustrates example graphical user interfaces 325, 350, and 375 where the user 156 can configure traffic mirror sources, traffic mirror targets, filters, and traffic mirror sessions. In some instances, the traffic mirroring system 102 may provide data for displaying a GUI to a display associated with the customer computing device 150.

In the example illustrated in FIG. 3A, GUI 325 shows user interface (UI) elements for creating a traffic mirror target. More or fewer UI elements may be included within GUI 325. As illustrated, the GUI 325 includes a UI element to enter a name/description, such as a name for the traffic mirror target and/or a description for the traffic mirror target. A UI element to enter target type such as whether the traffic mirror target is a network interface, or a network load balancer. UI elements to share VPCs with other customers. As can be seen an option is selected next to VPC 3 that authorizes two different customers to utilize the target being created. The customer may also associate one or more tags with the traffic mirror target that may be used for identification. Other UI elements can be utilized to select and/or configure the traffic mirror target. The example GUI 325 also includes a UI element for creating the traffic mirror target or canceling the creation.

In the example illustrated in FIG. 3B, GUI 350 shows user interface (UI) elements for creating a traffic mirror session. More or fewer UI elements may be included within GUI 350. As illustrated, the GUI 350 includes a UI element to enter a name/description, such as a name for the traffic mirror session and/or a description for the traffic mirror session. A UI element to enter information that identifies the target mirror source. UI elements to choose a traffic mirror target, and UI elements to specify filters, priority of the session, a limit on the size of the payload mirrored, a VXLAN identifier, and tags. The example GUI 350 also includes a UI element for creating the traffic mirror session or canceling the creation.

In the example illustrated in FIG. 3C, GUI 375 shows user interface (UI) elements for creating a traffic mirror filter. More or fewer UI elements may be included within GUI 375. As illustrated, the GUI 375 includes a UI element to enter a name/description, such as a name for the traffic mirror filter and/or a description for the traffic mirror filter. UI elements to enter information for inbound rules and UI elements for outbound rules. The example GUI 375 also includes a UI element for creating the traffic mirror filter or canceling the creation of the filter.

Figure 4:
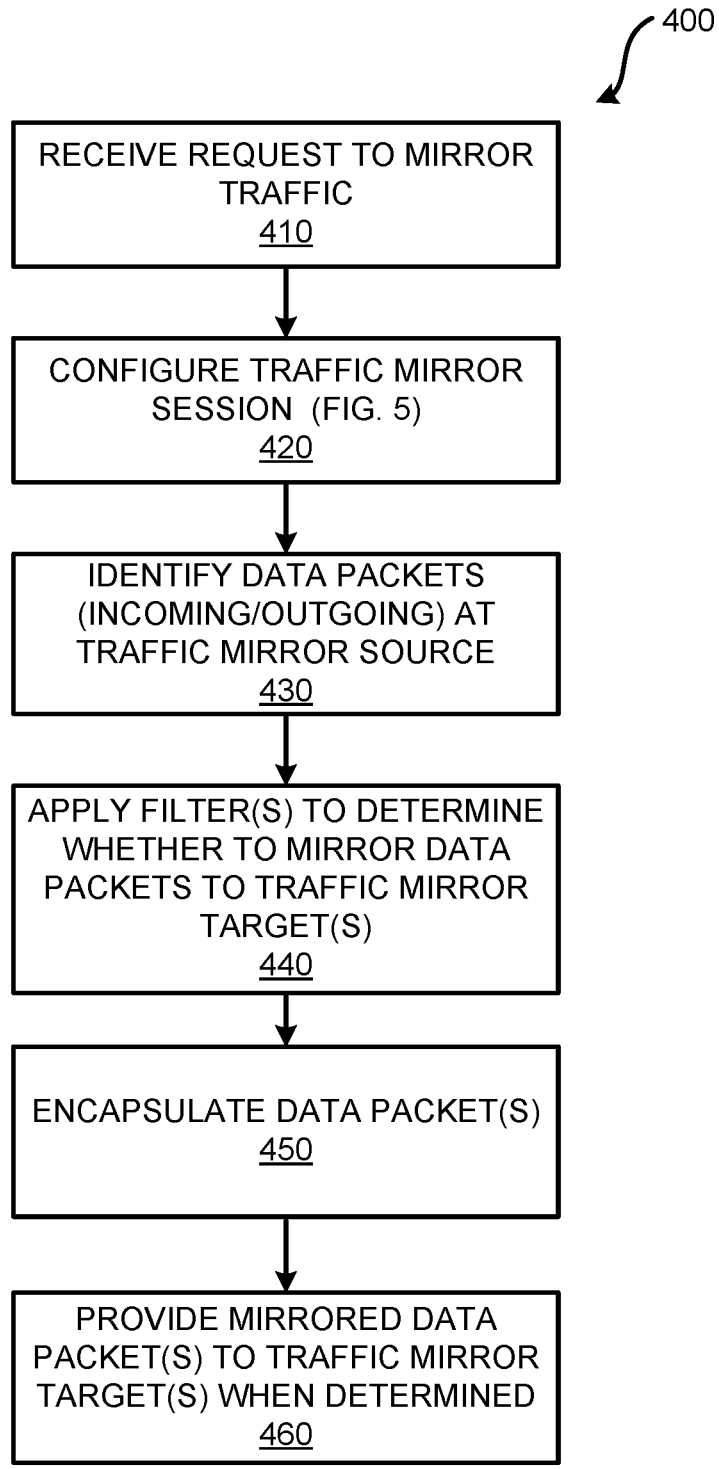
FIG. 4 is a flow diagram showing an illustrative routine for monitoring network traffic using traffic mirroring.
Figure 5:
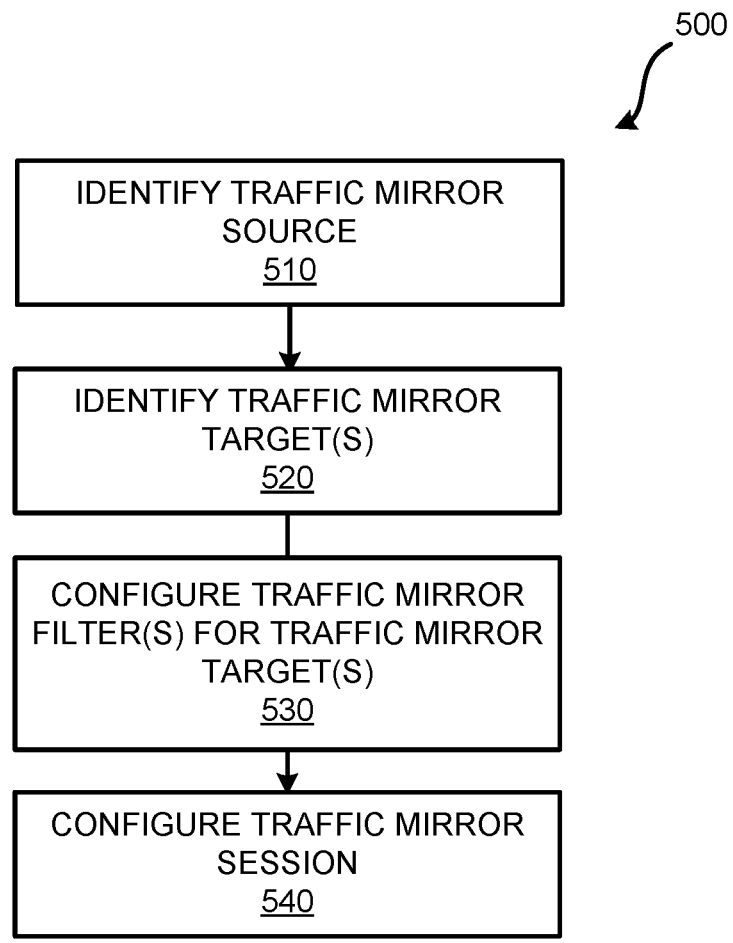
FIG. 5 is a flow diagram showing an illustrative routine for configuring a traffic mirror session.
Figure 6:
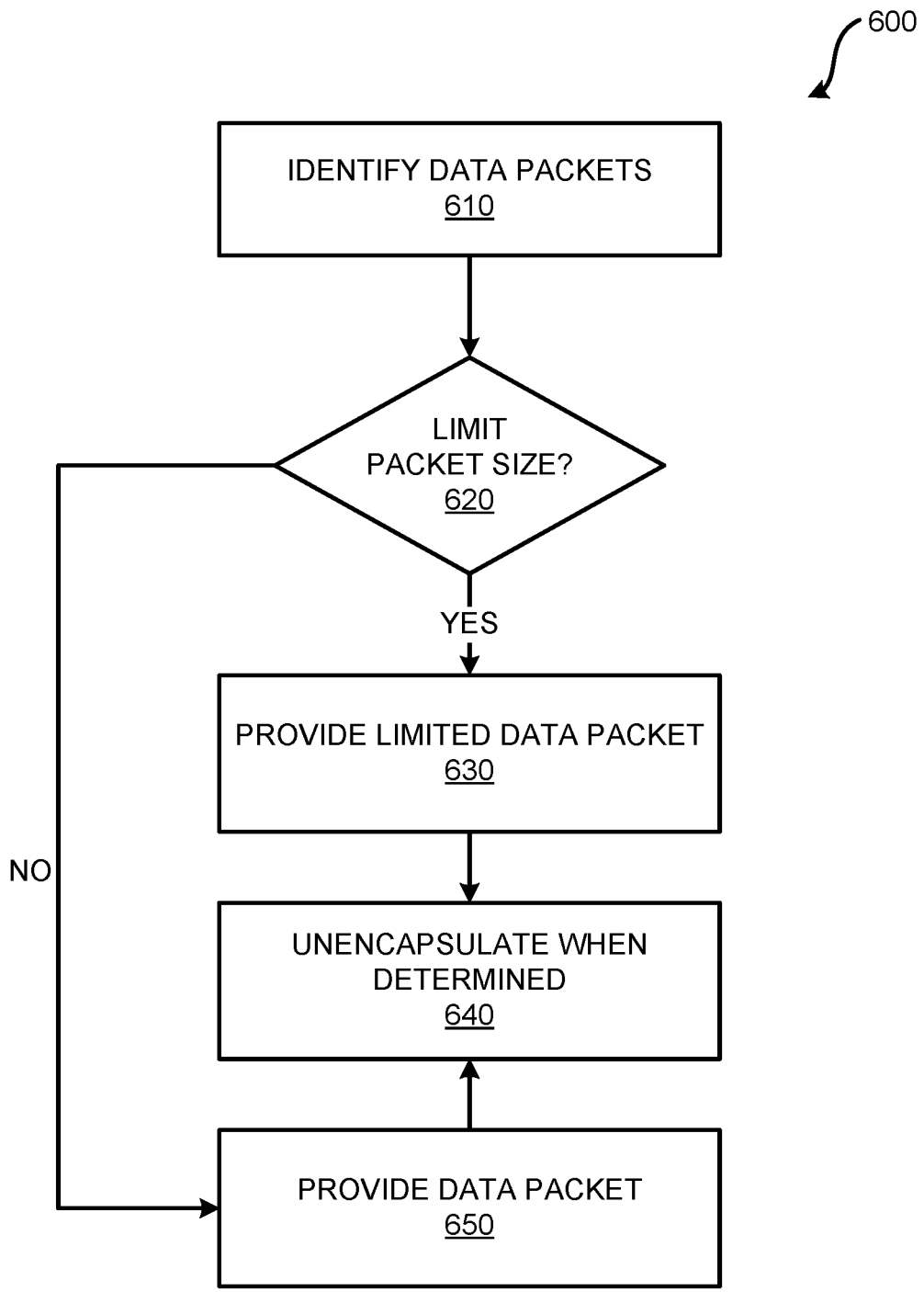
FIG. 6 is a flow diagram showing an illustrative routine for limiting a size of data packets for mirroring.

FIGS. 4-6 are flow diagrams showing illustrative routines 400, 500, and 600 for monitoring network traffic using traffic mirroring, according to examples disclosed herein. It should be appreciated that the logical operations described herein with respect to FIG. 4, FIG. 5, FIG. 6, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing an illustrative routine 400 for monitoring network traffic using traffic mirroring. At 410, a request to mirror traffic is received. As discussed above, the request may come from a customer 156 of the service provider, or by some other authorized entity.

At 420, a traffic mirror session is configured. As discussed above, the user 156, or some other authorized user or entity, may configure a traffic mirroring session using the traffic mirror user interface 152, APIs, command line interface, or some other input device. In some configurations, one or more GUIs, such as the GUIs 325, 350, and 375 illustrated in FIGS. 3A, 3B, and 3C are displayed that includes UI elements configured to traffic mirror source(s) 120, traffic mirror target(s) 130, and traffic mirror sessions. For instance, the user 156 may utilize the GUIs to select and specify configuration data associated with one or more traffic mirroring sessions. See FIG. 5 and related discussion for more details.

At 430, the traffic mirror source 120 identifies data packets associated with the traffic mirror source 120. As discussed above, the data packets may include incoming data packets that are addressed to traffic mirror source, and/or outgoing data packets to be provided by the traffic mirror source to IP addresses of the customer, another customer of the service provider, or some other IP address. The IP addresses may identify computing devices associated with the customer or computing devices of a different customer of the service provider, or some other user.

At 440, one or more filter(s) are applied to determine whether to mirror the data packets to the specified traffic mirror targets 130. As discussed above, the one more filters may include incoming filter rules associated with incoming data packets and/or outgoing filter rules associated with outgoing data packets. The traffic mirror source 120, or some other component or device, may identify characteristics of the received/outgoing data packets. The characteristics of the data packets may include information that be found within the data packet including, but not limited to, source IP address, destination IP address, source port, destination port, protocol type, and the like. The filter rules specified by the filter for the traffic mirroring session determine what data packets are mirrored.

At 450, the data packets may be encapsulated. As discussed above, the received data packet may be a layer 2 (data layer) packet that is converted by the mirror source to an IP packet (e.g., layer 4) via encapsulation, such that the packet can be sent out over private networks to on-premise destinations as well as destinations within the service provider network. According to some configurations, the data packets that are encapsulated are data packets that are mirrored.

At 460, the data packets not filtered out by the one or more filters are provided to respective computing devices identified by the IP addressed to which the received data packets were addressed. In other words, the data packets may be provided to their intended destinations.

FIG. 5 is a flow diagram showing an illustrative routine 500 for configuring a traffic mirror session, according to examples disclosed herein. The routine 500 begins at 510, where a traffic mirror source is identified. As discussed above, the traffic mirror source may be a source of data packets within a VPC hosted by the service provider. According to some configurations, a traffic mirror source may be a computing resource within a VPC that can be used as a source of traffic. The traffic mirror source may be an Elastic Network Interfaces (ENIs), a network load balancer, an internal gateway, a transit gateway, a virtual machine instance, and the like.

At 520, one or more traffic mirror targets is identified. As discussed above, a traffic mirror target serves as a destination for mirrored traffic. The traffic mirror target can be associated with the same customer, or a different customer. For example, a traffic mirror target may be a network load balancer in a VPC associated with another customer of the service provider.

At 530, one or more traffic mirror filter(s) are configured. As discussed above, a filter may specify the inbound or outbound (with respect to the source) traffic that is to be captured (accepted) or skipped (rejected). The filter can specify a protocol, ranges for the source and destination ports, and Classless Inter-Domain Routing (CIDR) blocks for the source and destination. In some configurations, rules are numbered, and may be processed in order within the scope of a particular traffic mirror session.

At 540, a traffic mirror session is configured. As discussed above, a traffic mirror session specifies a connection between a traffic mirror source and one or more traffic mirror targets that makes use of a filter. In some examples, traffic mirror sessions are numbered, evaluated in order, and a first match (accept or reject) is used to determine whether or not to mirror a packet.

FIG. 6 is a flow diagram showing an illustrative routine 600 for limiting a size of data packets for mirroring, according to examples disclosed herein. At 610, incoming/outgoing data packets that are to be mirrored are identified that are associated with the target mirror source. As discussed above, the customer 156 may configure the payload and/or the size of the mirrored data packets to be limited in size. For example, the customer may limit the size of the payloads and/or the total length of mirrored data packets in order to reduce the impact on the available bandwidth.

At 620, a decision is made as to whether to limit the size of the mirrored data packet. When a limit is associated with the packet, the process flows to 630. When a limit is not associated with the size of the packet, the process flows to 650.

At 630, the data packet is limited to the size as specified by the customer, or some other authorized entity and is provided to one or more traffic mirror targets. At 650, when the size of the packet is not to be limited, the data packet is provided to one or more traffic mirror targets. At 640, according to some examples, the packet may be unencapsulated before providing the data packet to one or more of the traffic mirror targets.

Figure 7:
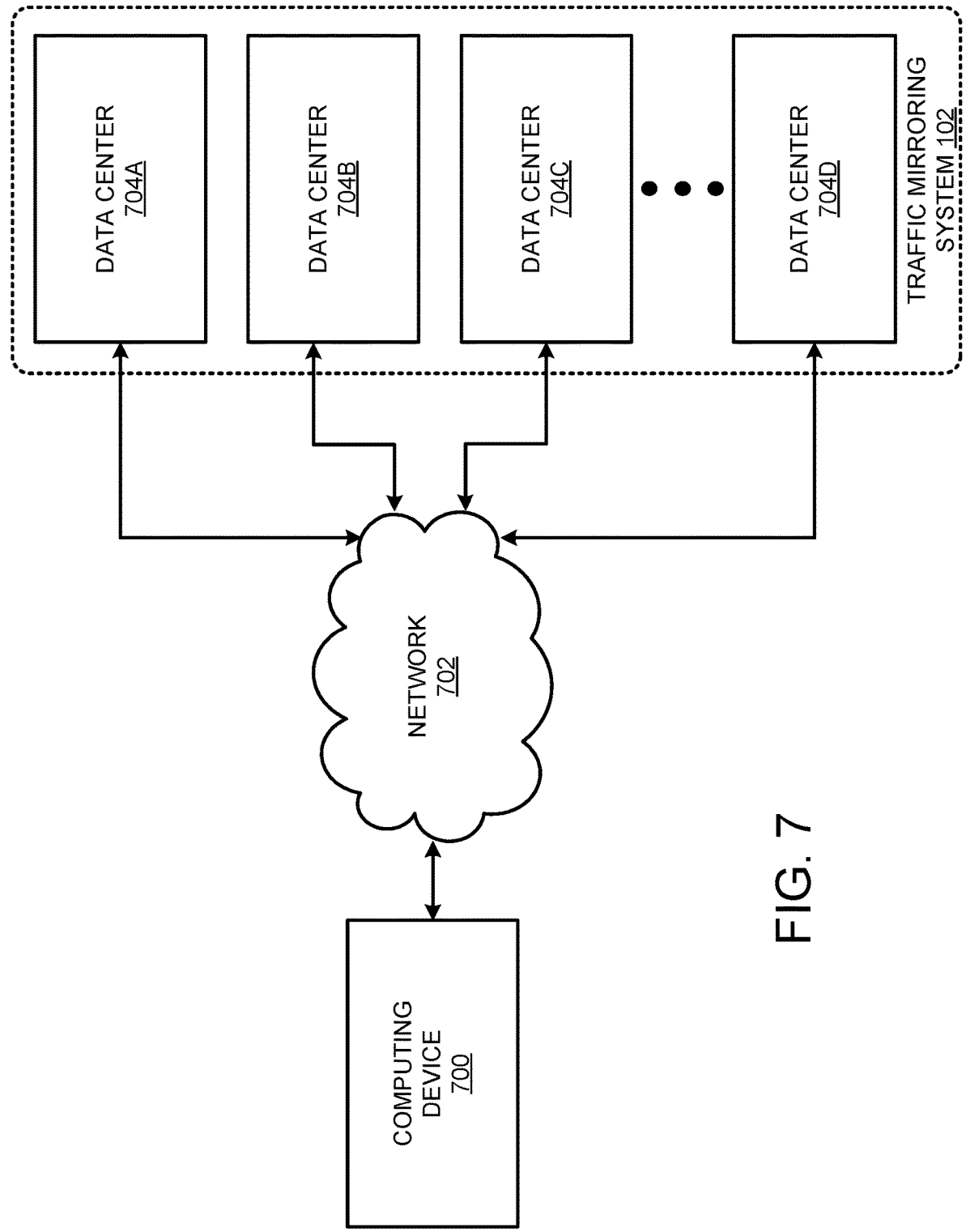
FIG. 7 is a system and network diagram that shows an illustrative operating environment including several data centers that can be configured to implement aspects of the functionality described herein.

FIG. 7 is a system and network diagram that shows one illustrative operating environment for the configurations disclosed herein that includes a traffic mirroring system 102 that can be configured to provide the functionality described above. As discussed above, the traffic mirroring system 102 can execute network services that provide computing resources for implementing the functionality disclosed herein. The computing resources implemented by the traffic mirroring system 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The traffic mirroring system 102 can also include and utilize other types of computing resources not mentioned specifically herein.

As also discussed above, the computing resources provided by the traffic mirroring system 102 are enabled in one implementation by one or more data centers 704A-704D (which might be referred to herein singularly as "a data center 704" or collectively as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that can be utilized to implement the technologies disclosed herein will be described below with regard to FIG. 8.

The users can access the services provided by the traffic mirroring system 102 over a network 702, which can be a wide area communication network ("WAN"), such as the Internet, an intranet or an Internet service provider ("ISP") network or a combination of such networks. For example, and without limitation, a computing device 700 operated by a user or other user of the traffic mirroring system 102, such as the computing device 124, can be utilized to access the traffic mirroring system 102 by way of the network 702. It should be appreciated that a local-area network ("LAN"), the Internet, or any other networking topology known in the art that connects the data centers 704 to remote users and other users can be utilized. It should also be appreciated that combinations of such networks can also be utilized.

Figure 8:
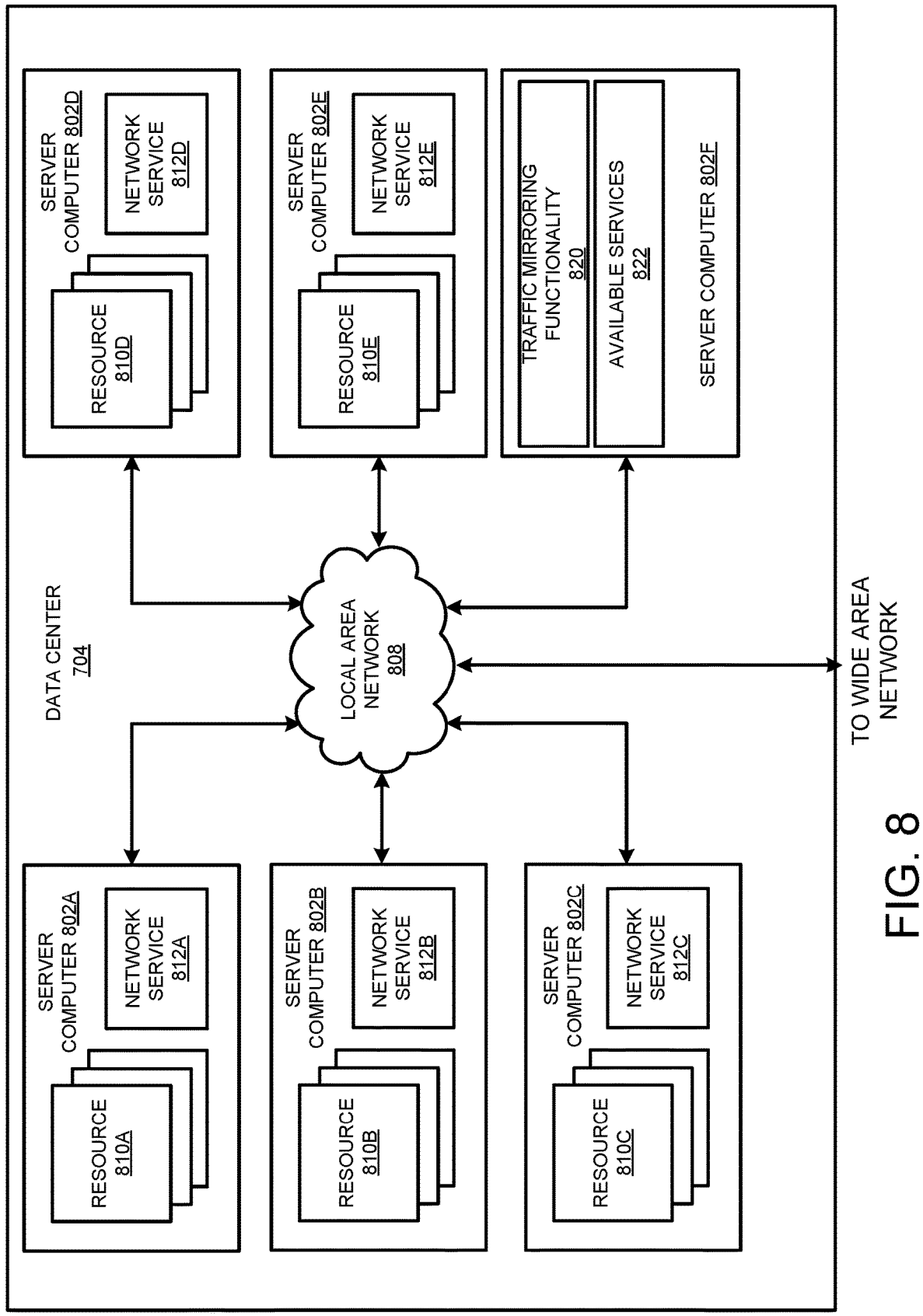
FIG. 8 is a computing system diagram illustrating a configuration for a data center that can be utilized to implement aspects of the technologies disclosed herein.

FIG. 8 is a computing system diagram that illustrates examples for a data center 704 that can be utilized to implement VPCs, traffic mirroring services, and the other functionality disclosed herein. The example data center 704 shown in FIG. 8 includes several server computers 802A-802F (which might be referred to herein singularly as "a server computer 802" or in the plural as "the server computers 802").

The server computers 802 can be standard tower, rack-mount, or blade server computers configured appropriately for providing various types of computing resources 810 for implementing the functionality disclosed herein. As mentioned above, the computing resources 810 provided by the data center 704 can be data processing resources such as VM instances or hardware computing systems, data storage resources, database resources, networking resources, and others. Some of the servers 802 can also be configured to execute network services 812A-812-E, respectively, capable of instantiating, providing and/or managing the computing resources 810A-810E.

The data center 704 shown in FIG. 8 also includes a server computer 802F that can execute some or all of the software components described above. For example, and without limitation, the server computer 802F can be configured to execute functionality described herein. The server computer 802F can also be configured to execute other components and/or to store data for providing some or all of the functionality described herein. In this regard, it should be appreciated that components or different instances of the services can execute on many other physical or virtual servers in the data centers 704 in various configurations.

In the example data center 704 shown in FIG. 8, an appropriate LAN 808 is also utilized to interconnect the server computers 802A-802F. The LAN 808 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704D, between each of the server computers 802A-802F in each data center 704, and, potentially, between computing resources 810 in each of the data centers 704. It should be appreciated that the configuration of the data center 704 described with reference to FIG. 8 is merely illustrative and that other implementations can be utilized.

Figure 9:
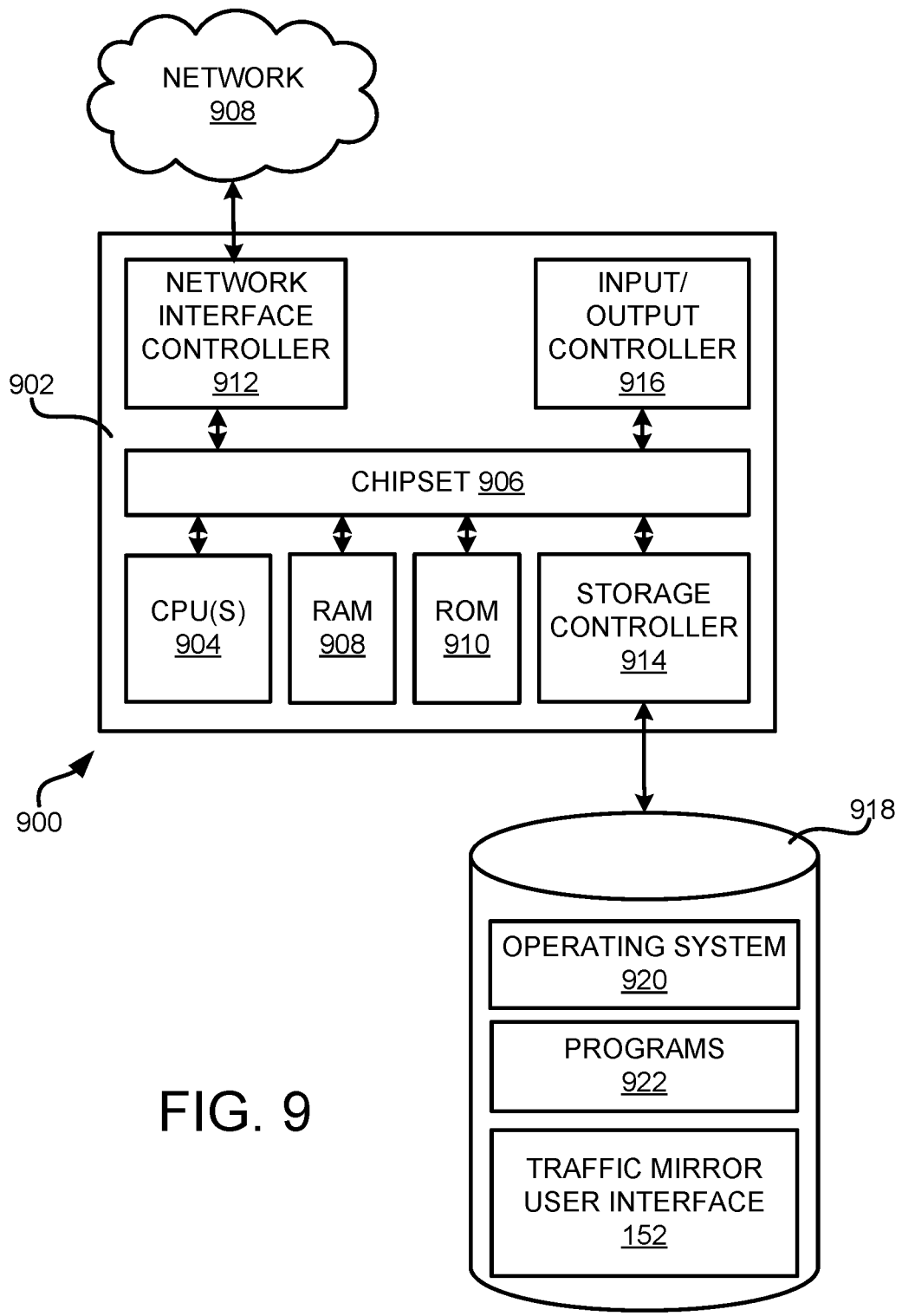
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 908. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, user interface 132, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 918 can store other system or application programs and data utilized by the computer 900.

In examples, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to examples, the computer 900 has access to computer-readable storage media storing computer-executable instructions which, when executed by the computer 900, perform the various processes described above with regard to FIGS. 1-8. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for monitoring traffic using traffic mirroring have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
   one or more processors; and
   a non-transitory computer-readable storage medium having instructions stored thereupon which, when executed by the one or more processors, cause the system to:
      receive a request to mirror at least a portion of data packets originating within a Virtual Private Cloud (VPC) associated with a customer of a cloud provider network;
      identify one or more computing resources within the VPC to act as a traffic mirror source that acts as a source of mirrored data packets, wherein the one or more computing resources comprise one or more of a load balancer within the VPC, an internal gateway within the VPC, a transit gateway, an elastic network interface (ENI) within the VPC, a container service, or a container service interface;
      identify one or more traffic mirror targets that act as a target for receiving the mirrored data packets;
      configure one or more filters that specify one or more rules used by the traffic mirror source to identify the at least the portion of the data packets to mirror;
      configure one or more tags that identify a traffic mirror session;
      establish, based at least in part on the one or more tags, the traffic mirror session between the traffic mirror source and the one or more traffic mirror targets;
      configure, the traffic mirror source, to provide data to the one or more traffic mirror targets based, at least in part, on the one or more filters;
      identify, via the traffic mirror source, data packets associated with the traffic mirror source, wherein the data packets comprise one or more of incoming data packets to the traffic mirror source or outgoing data packets from the traffic mirror source;
      identify, via the traffic mirror source, characteristics of the data packets;
      determine, via the traffic mirror source, the at least the portion of the data packets to mirror to at least one of the one or more traffic mirror targets based at least in part on one or more of the characteristics and the one or more filters;
      generate, via the traffic mirror source, the mirrored data packets based at least in part on the at least the portion of the data packets;
      provide, via the traffic mirror source, the mirrored data packets to the target; and
      pause the traffic mirror session between the traffic mirror source and the one or more traffic mirror targets, wherein the traffic mirror session is resumable at a later time.

2. The system of claim 1, wherein the one or more computing resources comprise one or more of the elastic network interface (ENI) within the VPC, the container service, the container service interface, the interface for a compute engine that runs containers, or the interface for a service that runs code without provisioning or managing servers.

3. The system of claim 1, wherein at least one of the one or more traffic mirror targets are located within a second VPC that is associated with a second customer of the cloud provider network.

4. The system of claim 1, wherein generate the mirrored data packets comprises encapsulating the at least the portion of the data packets within a VxLAN header.

5. The system of claim 1, wherein the instructions further cause the system to provide a user interface to a computing device associated with the customer, wherein the request to mirror is received via the user interface.

6. A computer-implemented method, comprising:
   identifying data packets at one or more traffic mirror sources within a Virtual Private Cloud (VPC) that are associated with a customer of a service provider, wherein the one or more traffic mirror sources comprise one or more of a load balancer within the VPC, an internal gateway within the VPC, a transit gateway, an elastic network interface (ENI) within the VPC, a container service, or a container service interface;
   identifying characteristics of the data packets;
   determining at least a portion of the data packets to mirror to one or more traffic mirror targets based at least in part on one or more of the characteristics;
   provide the at least a portion of the data packets to the one or more traffic mirror targets;
   configure one or more tags that identify a traffic mirror session;
   establishing, based at least in part on the one or more tags, the traffic mirror session between the one or more traffic mirror sources and the one or more traffic mirror targets; and
   pausing the traffic mirror session between the one or more traffic mirror sources and the one or more traffic mirror targets, wherein the traffic mirror session is resumable at a later time.

7. The computer-implemented method of claim 6, further comprising receiving, from a computing device associated with the customer, a request to monitor the one or more traffic mirror sources for the at least the portion of the data packets to mirror to the one or more traffic mirror targets.

8. The computer-implemented method of claim 6, wherein the one or more traffic mirror sources comprise one or more of the elastic network interface (ENI) within the VPC, the container service interface, the interface for a compute engine that runs containers, or the interface for a service that runs code without provisioning or managing servers.

9. The computer-implemented method of claim 6, further comprising receiving, from a computing device associated with the customer, data identifying the one or more traffic mirror targets.

10. The computer-implemented method of claim 6, wherein at least one of the one or more traffic mirror targets are located within a second VPC that is associated with a second customer of the service provider.

11. The computer-implemented method of claim 6, further comprising:
receiving one or more filter rules associated with the one or more traffic mirror sources, wherein the one or more filter rules include one or more inbound rules associated with incoming data packets, or outbound rules associated with outgoing data packets; and
configuring the one or more filters to apply the one or more filter rules to the data packets.

12. The computer-implemented method of claim 11, further comprising,
configuring the one or more traffic mirror sources to provide data to the one or more traffic mirror targets based, at least in part, on the one or more filters.

13. The computer-implemented method of claim 6, further comprising encapsulating individual ones of the at least the portion of the data packets within a VxLAN header before providing the at least the portion of the data packets to the one or more traffic mirror targets and unencapsulating the individual ones of the at least the portion of the data packets after the providing the at least the portion of the data packets to the one or more traffic mirror targets.

14. The computer-implemented method of claim 6, further comprising limiting a size of the at least the portion of the data packets before providing the at least a portion of the data packets to the one or more traffic mirror targets.

15. The computer-implemented method of claim 6, further comprising:
causing a computing device associated with the customer to display a graphical user interface that includes user interface elements; and
receiving data from the computing device indicating the traffic mirror sources, the traffic mirror targets, and one or more filter rules based, at least in part, on an interaction with one or more of the user interface elements.

16. A system, comprising:
one or more processors; and
a non-transitory computer-readable storage medium having instructions stored thereupon which, when executed by the one or more processors, cause the system to perform actions comprising:
identifying data packets at one or more traffic mirror sources within a Virtual Private Cloud (VPC), wherein the one or more traffic mirror sources comprise one or more of a load balancer within the VPC, an internal gateway within the VPC, a transit gateway, an elastic network interface (ENI) within the VPC, a container service, or a container service interface;
determining at least a portion of the data packets to mirror to one or more traffic mirror targets based at least in part on one or more filters;
providing the at least a portion of the data packets to the one or more traffic mirror targets;
configure one or more tags that identify a traffic mirror session;
establishing, based at least in part on the one or more tags, the traffic mirror session between the one or more traffic mirror sources and the one or more traffic mirror targets; and
pausing the traffic mirror session between the one or more traffic mirror sources and the one or more traffic mirror targets, wherein the traffic mirror session is resumable at a later time.

17. The system of claim 16, further comprising receiving, from a computing device, a request to monitor the one or more traffic mirror sources for the at least the portion of the data packets to mirror to the one or more traffic mirror targets.

18. The system of claim 16, wherein the one or more traffic mirror sources comprise one or more of the internal gateway within the VPC, the transit gateway, the elastic network interface (ENI) within the VPC, the container service interface, the interface for a compute engine that runs containers, or the interface for a service that runs code without provisioning or managing servers.

19. The system of claim 16, further comprising:
receiving, from a computing device, data identifying the one or more traffic mirror targets.

20. The system of claim 16, wherein at least one of the one or more traffic mirror targets are located within a second VPC.

\* \* \* \* \*